United States Patent [19]
Benson

[11] Patent Number: 6,050,641
[45] Date of Patent: *Apr. 18, 2000

[54] FOUR-WAY POWER LUMBAR SYSTEM

[75] Inventor: Joseph Benson, South Lyon, Mich.

[73] Assignee: Schukra of North America, Ltd., Windsor, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/994,090

[22] Filed: Dec. 19, 1997

Related U.S. Application Data

[60] Provisional application No. 60/033,693, Dec. 20, 1996.

[51] Int. Cl.[7] ........................................... A47C 7/46

[52] U.S. Cl. .................... 297/284.4; 297/284.1; 297/284.7; 297/284.8

[58] Field of Search ................ 297/284.4, 284.7, 297/284.8, 284.1

[56] References Cited

U.S. PATENT DOCUMENTS

| | | | |
|---|---|---|---|
| 5,197,780 | 3/1993 | Coughlin | 297/284.4 X |
| 5,217,278 | 6/1993 | Harrison et al. | 297/284.4 X |
| 5,449,219 | 9/1995 | Hay et al. | 297/284.4 |
| 5,567,010 | 10/1996 | Sparks | 297/284.4 |
| 5,567,011 | 10/1996 | Sessini | 297/284.4 X |
| 5,609,394 | 3/1997 | Ligon, Sr. et al. | 297/284.4 |
| 5,704,687 | 1/1998 | Klingler | 297/284.4 |

*Primary Examiner*—Peter M. Cuomo
*Assistant Examiner*—Rodney B. White
*Attorney, Agent, or Firm*—Howard & Howard

[57] ABSTRACT

A four-way power lumbar support system which provides for both an in-out directional adjustment and an up-down directional adjustment including a pair of directional one-way locking clutches that slip in one direction and lock in another direction, a single motor, and a single gearbox assembly. The motor output drives the two directional one-way locking clutches setup to slip and lock in opposite directions of rotation causing one to engage for clockwise rotation of the motor and the other to engage for counter-clockwise rotation of the motor.

21 Claims, 2 Drawing Sheets

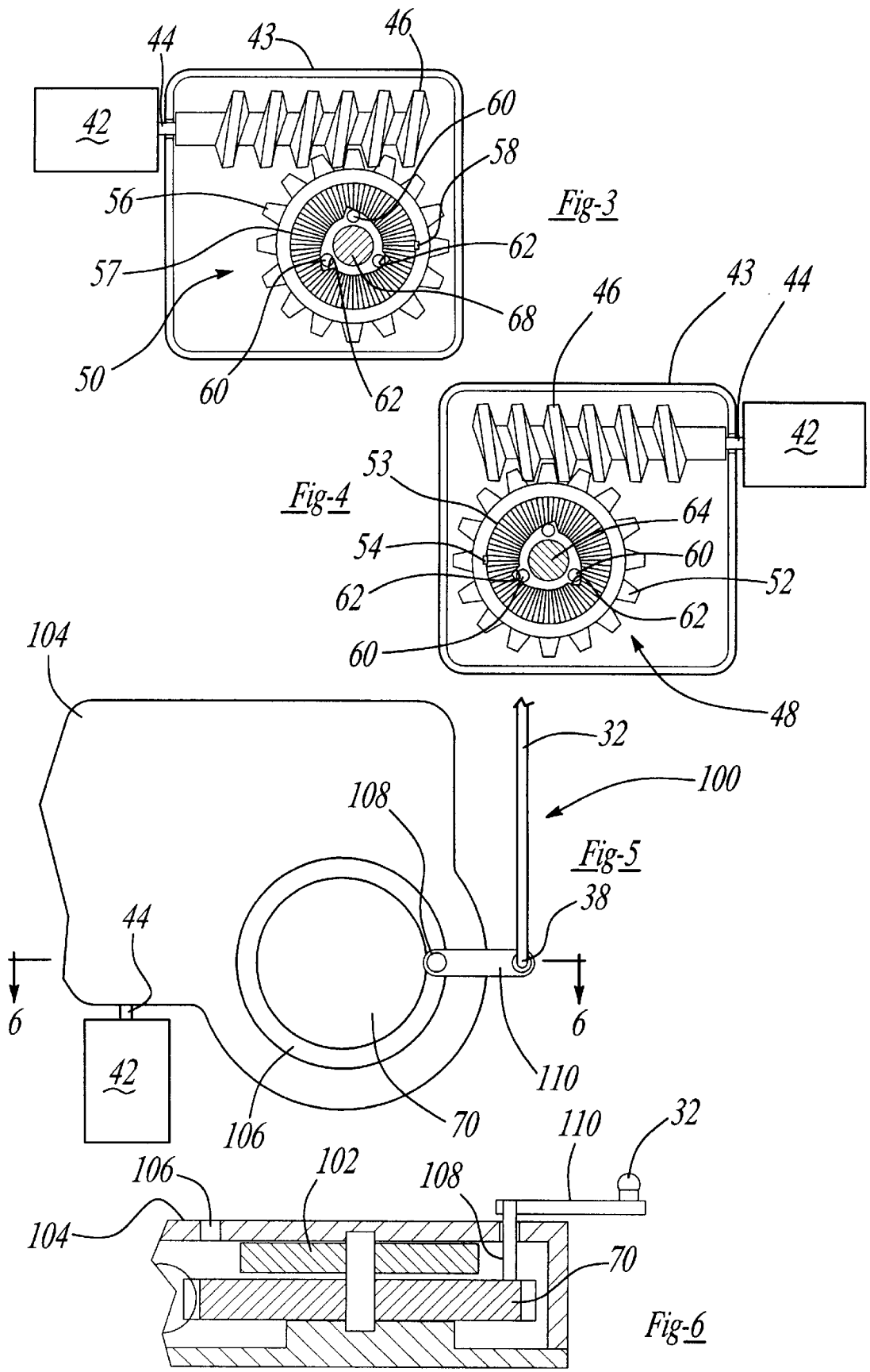

FOUR-WAY POWER LUMBAR SYSTEM

This application is an utility application of a previously filed U.S. provisional application for a patent under Serial No. 60/033,693, filed Dec. 20, 1996 entitled Four-Way Power Lumbar System.

BACKGROUND OF THE INVENTION

1. Technical Field

The present invention generally relates to a four-way power lumbar support system. More particularly, the present invention relates to a four-way power lumbar support system which provides outputs for in-out directional adjustments and up-down directional adjustments by using a single motor and a single gearbox assembly.

2. Discussion

A conventional power lumbar support system uses a motor and gearbox assembly commonly referred to as an actuator for each mode, adjustment or plane of operation. Thus, a two-way power lumbar support system would provide an arching directional adjustment of a flexible, resilient support element in an in-out direction and require a single actuator. A four-way power lumbar support system would provide an arching directional adjustment of a flexible, resilient support element plus a level directional adjustment, in an up-down direction, which would require two separate actuators, one for each adjustment direction. Two such actuators promotes complication, increases overall size and weight, and promotes duplication of gearbox components. The types of devices as described in the current four-way power lumbar support systems also include complicated switches which provide for two-directional operation. Such a switch can be used to allow the motor to rotate in one direction thus causing adjustment in one direction. A second direction reverses the motor thereby causing and resulting in a second adjustment direction.

Accordingly, the need exists to provide an improved, cost-effective, light weight and efficient four-way power lumbar support system. The current invention creates such a four-way power lumbar support system and offers major improvements over previous systems such as providing a 50% savings on motors and a significant reduction in gearbox component duplication.

SUMMARY OF THE INVENTION

The present invention is a substantial improvement over the current four-way power lumbar support systems because it provides a lumbar support system that is light weight, flatter in size, has fewer components and is less, costly.

Thus, it is a purpose of the present invention to overcome the disadvantages of the current four-way power lumbar support system art and thereby provide a relatively light weight, flatter in size, cost efficient four-way power lumbar support system.

It is a principal object of the present invention to provide a four-way power lumbar support system which has reduced overall size and weight, fewer components, reduction of duplicative gearbox components and is cost efficient.

A related object of the present invention is to provide a four-way power lumbar support system which advances and easily accomplishes the comfort features of massage and micro-adjustment.

It is another object of the present invention to provide a four-way power lumbar support system which includes a pair of one-way clutches that slip in one direction and lock in another direction resulting in two different outputs, one that engages for clockwise rotation of the motor and the other that engages for counter-clockwise rotation of the motor.

A related object of the present invention is to provide a four-way power lumbar support system which provides for continuous cyclical adjustment of each directional adjustment.

It is another object of the present invention to provide a four-way power lumbar support system which provides for an increase in directional adjustment limitations through the use of extension arms.

In one form, the present invention provides the art with a four-way power lumbar support system including a flexible support element, an operating device and a gearbox assembly. The gearbox assembly includes a pair of one-way clutches and a pair of Bowden cable arrangements such that the operating device provides for adjustments of the flexible support element.

Additional benefits, along with other advantages and objects of the present invention will become apparent to those skilled in the art from a reading of the subsequent detailed description, appended claims and accompanying drawings.

BRIEF DESCRIPTION OF THE DRAWINGS

In the drawings which illustrate the best mode presently contemplated for carrying out the present invention:

FIG. 3 is an enlarged cross-sectional view taken along the line 3—3 of FIG. 2;

FIG. 4 is an enlarged cross-sectional view taken along the line 4—4 of FIG. 2;

FIG. 5 is an enlarged front view of a second embodiment of the present invention; and FIG. 6 is a side sectional view of the apparatus of FIG. 5.

DETAILED DESCRIPTION OF THE PREFERRED EMBODIMENT

Figure 1:
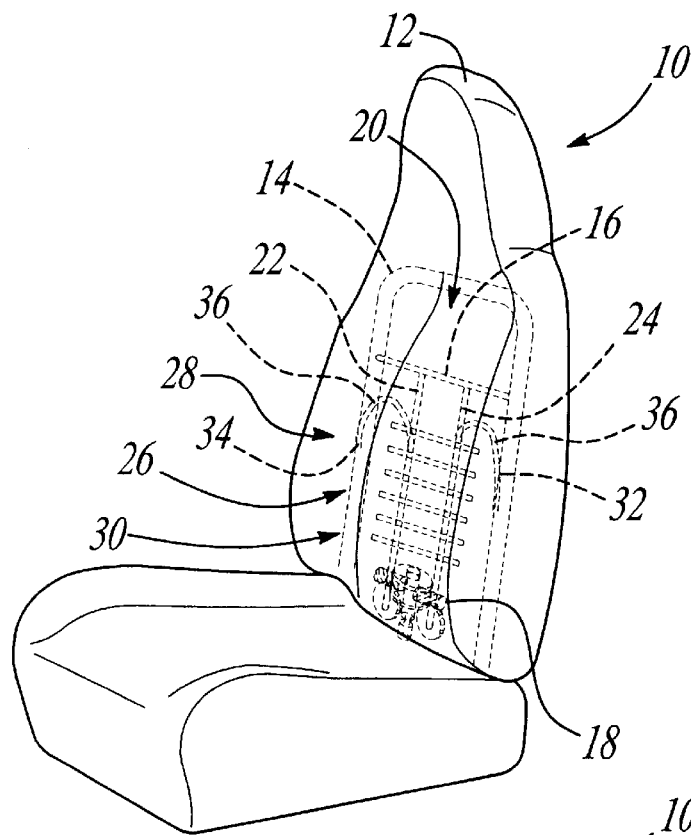
FIG. 1 is an environmental view of a four-way power lumbar support system constructed in accordance with the teachings of a preferred embodiment of the present invention and shown operatively installed in this back rest of a seat.

Referring now to the drawings, there is depicted a four-way power lumbar support system embodying the concepts of the present invention. The four-way power lumbar support system of the present invention is generally identified in the drawings with reference numeral 10 and is shown through the drawings adapted to cooperate with a specific back rest 12 of a seat. However, the teachings of the present invention are more broadly applicable to back rests for a large range of applications.

Prior to addressing the construction and operation of the four-way power lumbar support system 10 of the present invention, a brief understanding of the exemplary back rest 12 shown in FIG. 1 is warranted. The environmental view of FIG. 1 illustrates the four-way power lumbar support system 10 operatively installed in the back rest 12. The back rest 12 illustrated is otherwise of conventional construction and shown to generally include a frame 14 in which between two transverse struts 16 and 18, and a guide 20 are fitted. The guide 20 includes two rods 22 and 24 which are parallel to one another. A support element 26 is operably connected to parallel rods 22 and 24 so as to be capable of moving up and down the guide 20. The support element 26 may be any general support element, made of any general material including plastic, metal or any combination thereof, in a plurality of parts or in one piece having an upper portion 28 for supporting the lumbar vertebrae and a lower portion 30 for supporting the pelvis and the pelvic vertebrae.

The four-way power lumbar support system 10 is capable of adjusting for arching, that is, in the in-out direction, as well as for level adjustment, that is, in the up-down direction. These adjustments are accomplished through the use of Bowden cable arrangements 32 and 34. The Bowden cable arrangement 32 is used for arching adjustments, that is, in the in-out direction, while the Bowden cable arrangement 34 is used for level adjustment, that is, in the up-down direction. The Bowden cable arrangements 32 and 34 include a sheath 36 and a sheathed cable 38. The sheath 36 of the Bowden cable arrangements 32 and 34 is fixed at one end to the support element 26 and at the other end to a gearbox assembly 40. The sheathed cable 38 of the Bowden cable arrangements 32 and 34 extends from the sheath 36 and is fixed at one end to the support element 26 and at the other end to a gear located in the gearbox assembly 40.

As will become apparent below, the four-way power lumbar support system 10 is operative to drive both in-out directional adjustments (arching) and up-down directional adjustments (level) through the use of a single motor and gearbox assembly which reduces overall size and weight, and eliminates one complete motor and some duplication of gearbox components.

Figure 2:
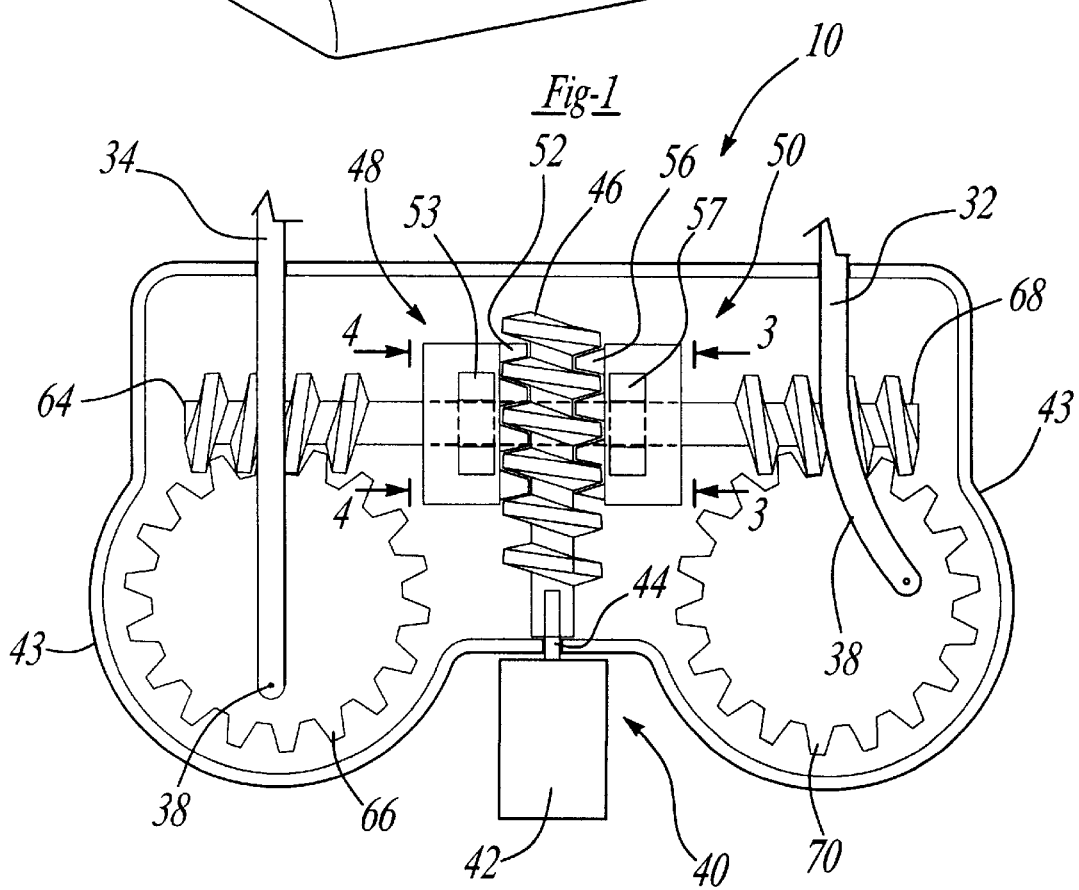
FIG. 2 is an enlarged front view of the apparatus of FIG. 1 shown removed from the back rest for purposes of illustration.

With continued reference to FIG. 2, FIG. 3 and FIG. 4, the four-way power lumbar support system 10 of the preferred embodiment of the present invention will now be further discussed. As shown most clearly in the enlarged front view of FIG. 2, the four-way power lumbar support system 10 includes a gearbox assembly 40, a motor 42 and a housing 43. The motor 42 includes a drive shaft 44 on which a worm gear 46 is mounted. The worm gear 46 mounted to the drive shaft 44 projects into the gearbox assembly 40 and the housing 43. The worm gear 46 is in tooth engagement with directional one-way locking clutches 48 and 50.

The directional one-way locking clutch 48 includes an outer ring of gear teeth 52 and an inner ring 53. The outer ring of gear teeth 52 is rotatably attached to the inner ring 53 of the directional one-way locking clutch 48 by a key 54 or any other suitable attachment means such that the outer ring of gear teeth 52 continuously rotates as the worm gear 46 is driven by the motor 42. Similarly, the directional one-way locking clutch 50 includes an outer ring of gear teeth 56 and an inner ring 57. The outer ring of gear teeth 56 is rotatably attached to the inner ring 57 of the directional one-way locking clutch 50 by at key 58 or any other suitable attachment means such that the outer ring of gear teeth 56 continuously rotates as the worm gear 46 is driven by the motor 42. The inner rings 53 and 57 of the directional one-way locking clutches 48 and 50, respectively are designed to slip in one direction and lock in the other direction. The directional one-way locking clutch 48 is a mirror image of the directional one-way locking clutch 50. That is, the inner ring 53 of the directional one-way locking clutch 48 locks during clockwise rotation of the motor 42 and slips or engages for counter-clockwise rotation of the motor 42. As shown most clearly in the enlarged cross-sectional view of FIG. 4, the inner ring 53 of the directional one-way locking clutch 48 is illustrated in its fully locked position with bearings 60 running up against and abutting walls 62, thereby preventing any further rotation of the inner ring 53 in the clockwise direction. On the other hand, the inner ring 57 of the directional one-way locking clutch 50 locks during counter-clockwise rotation of the motor 42 and slips or engages for clockwise rotation of the motor 42 As shown most clearly in the enlarged cross-sectional view of FIG. 3, the directional one-way locking clutch 50 is illustrated in its fully locked position with bearings 60 running up against and abutting walls 62, thereby preventing any further rotation of the inner ring 57 in the counter-clockwise direction. The directional one-way locking clutches 48 and 50 can be integrated to a great extent into the gear components to minimize added expense and complexity. It should be noted that anyone of a variety of types of directional one-way locking clutches can be used.

Thus, the direction of rotation of the motor 42 determines whether the up-down or the in-out directional adjustments are performed. The directional one-way locking clutch 48 mechanically engages a worm gear 64. The worm gear 64 is in tooth engagement with a gear wheel 66. Attached to the gear wheel 66 is the sheathed cable 38 of the Bowden cable arrangement 34 such that when the gear wheel 66 rotates, the sheathed cable 38 provides for up-down directional adjustment. The amount of travel of the sheathed cable 38 of the Bowden cable arrangement 34 and thereby the amount of up-down directional adjustment provided is controlled by the size of the gear wheel 66. For example, during its cycle of rotation, as the gear wheel 66 rotates 180°, the support element 26 may go through its entire range of up directional adjustments. Thereafter, as the gear wheel 66 continues to rotate the remaining 180°, the support element 26 returns and goes through its entire range of down directional adjustments. Similarly, the directional one-way locking clutch 50 mechanically engages a worm gear 68. The worm gear 68 is in tooth engagement with a gear wheel 70. Attached to the gear wheel 70 is the sheathed cable 38 of the Bowden cable arrangement 32 such that when the gear wheel 70 rotates, the sheathed cable 38 provides for in-out directional adjustment. The amount of travel of the sheathed cable 38 of the Bowden cable arrangement 32 and thereby the amount of in-out directional adjustment provided is controlled by the size of the gear wheel 70. For example, during its cycle of rotation, as the gear wheel 70 rotates 180°, the support element 26 may go through its entire range of in directional adjustments. Thereafter, as the gear wheel 70 continues to rotate the remaining 180°, the support element 26 returns and goes through its entire range of out directional adjustments.

In the preferred embodiment, the four-way power lumbar support system 10 includes a single motor 42, the direction of rotation of which determines whether an up-down or an in-out directional adjustment is performed. The motor 42 drives the drive shaft 44 which causes the worm gear 46 to rotate. During this rotation of the worm gear 46, the worm gear 46, in tooth engagement with the outer ring of gear teeth 52 of the directional one-way locking clutch 48 and the outer ring of gear teeth 56 of the directional one-way locking clutch 50, causes the outer rings of gear teeth 52 and 56 to rotate continuously. If in-out directional adjustments are desired, the directional one-way locking clutch 50, which is mechanically engaged with the worm gear 68 and engages for clockwise rotation of the motor 42, engages, driving the worm gear 68 which in turn drives the gear wheel 70 such that the sheathed cable 38 of the Bowden cable arrangement 32 provides for in-out directional movement. Contemporaneously, as shown in FIG. 4, the directional one-way locking clutch 48 is in its fully locked position.

Similarly, if up-down directional adjustments are desired, the directional one-way locking clutch 48, which is mechanically engaged with the worm gear 64 and engages for counter-clockwise rotation of the motor 42, engages, driving the worm gear 64 which in turn drives the gear wheel 66 such that the sheathed cable 38 of the Bowden cable arrangement 34 provides for up-down directional movement. Contemporaneously, as shown in FIG. 3, the directional one-way locking clutch 50 is in its fully locked position.

In a second embodiment of the present invention, the amount of up-down and in-out directional adjustment is increased. Referring now to FIG. 5 and FIG. 6, a second embodiment of the four-way power lumbar support system of the present invention is generally identified with reference numeral 100. As with the four-way power lumbar support system 10, the right and left sides of the gearbox assembly 40 are mirror images of each other. Thus, only the in-out directional adjustments are illustrated in FIG. 5 and FIG. 6. Moreover, like reference numbers from the four-way power lumbar support 10 will be used to describe similar components.

The four-way power lumbar support system 100 includes a spacer 102, a housing 104 having a slot 106 formed therein, a post 108 and a linkage arm 110. The post 108 is attached by any suitable attachment means to the gear wheel 70. Alternatively, the linkage arm 110 could be set in an arcuate slot in the sidewall of the housing 104 and attach between the gear wheel 70 and the Bowden cable arrangement 32. The linkage arm 110 is attached by any suitable attachment means to the post 108. The sheathed cable 38 of the Bowden cable arrangement 32 is rotatably attached to the linkage arm 110. Thus, the amount of in-out directional adjustment provided is increased on a magnitude of the length of the linkage arm 110.

A further alternative would include a direct linkage between either the gear (or a gear with a linkage arm) and the lumbar support. This direct linkage could be used on either one or both gears, and control either the up-down and/or the in-out directional features of the lumbar support.

In the present invention, continuous cyclical adjustment of each direction is required because reversing the motor 42 does not reverse the adjustment direction, but rather switches motor output to the other adjustment mode. That is, if the switch is activated for a particular directional adjustment, the four-way power lumbar support system 10 would cycle repeatedly in that adjustment mode until the switch is released. Switch simplification is thereby possible since two directional operation is no longer needed. Additionally, advanced comfort features of massage and micro-adjustment can easily be accommodated with the four-way power lumbar support system 10, and in some respects are simplified because there is no longer a need to reverse direction.

Moreover, the directional one-way locking clutches 48 and 50 may be located at any level of gear reduction away from the motor 42 to optimize torque loading vs. speed and generated noise. Operating the directional one-way locking clutches 48 and 50 close to the speed of the motor 42 would minimize torque requirements but result in high speed running that could be noisy and accelerate wear. Operating the directional one-way locking clutches 48 and 50 at the highest gear reduction end of the gear train would produce slow quiet operation, but require a larger size to carry the higher forces.

The same principles associated with the four-way power lumbar support system 10 are also applicable to a manually operated lumbar support system. Moreover, the selective routing of the motor output based on motor rotation direction can be applied to any motorized application where two different and independent adjustments are required, and continuous cycling adjustment of the mechanisms is acceptable.

While the above detailed description describes the preferred embodiment of the present invention, it should be understood that the present invention is susceptible to modification, variation and alteration without deviating from the scope and fair meaning of the subjoined claims.

What is claimed is:

1. A lumbar support system comprising:
   a flexible support element having a first directional adjustment and a second directional adjustment;
   an operating device selectively driveable in a first direction to operate said first directional adjustment, and in a second direction to operate said second directional adjustment; and
   a gearbox assembly for selectively adjusting said flexible support element, said gearbox assembly including:
      a first one-way clutch operably coupled to said operating device;
      a first Bowden cable arrangement having a drive end operably coupled to said first one-way clutch and a driven end operably coupled to said flexible support element such that said operating device at least substantially continuously adjusts said first directional adjustment of said flexible support element when driven in said first direction;
      a second one-way clutch operably coupled to said operating device; and
      a second Bowden cable arrangement having a drive end operably coupled to said second one-way clutch and a driven end operably coupled to said flexible support element such that said operating device at least substantially continuously adjusts said second directional adjustment of said flexible support element when driven in said second direction.

2. The lumbar support system according to claim 1 wherein said first one-way clutch locks and said second one-way clutch slips when said operating device is driven in a first rotational direction and said second one-way clutch locks and said first one-way clutch slips when said operating device is driven in a second rotational direction.

3. The lumbar support system according to claim 2 wherein said first rotational direction comprises a clockwise rotational direction and said second rotational direction comprises a counter-clockwise rotational direction.

4. The lumbar support system according to claim 1 further comprising:
   a first worm gear rotatably mounted to said operating device;
   a second worm gear operably connected to said first one-way clutch and said first worm gear;
   a third worm gear operably connected to said second one-way clutch and said first worm gear; and
   a pair of gear wheels operably connected to said second and third worm gears, whereby the rotation of said first worm gear drives said pair of gear wheels thereby adjusting said first directional adjustment and said second directional adjustment of said flexible support element.

5. The lumbar support system according to claim 1 wherein said first directional adjustment of said flexible support element is a level directional adjustment and said second directional adjustment of said flexible support element is an arching directional adjustment.

6. The lumbar support system according to claim 1 wherein said operating device is manually operated.

7. The lumbar support system according to claim 1 wherein said operating device includes an electric motor.

8. The lumbar support system according to claim 1 wherein said flexible support element includes an upper portion for supporting a lumbar vertebrae region and a lower portion for supporting a pelvic vertebrae region.

9. A lumbar support system comprising:
   a flexible support element having a first directional adjustment and a second directional adjustment;
   a drive motor selectively driveable in a clockwise direction to operate said first directional adjustment and in a counter-clockwise direction to operate said second directional adjustment; and
   a gearbox assembly for selectively adjusting said flexible support element, said gearbox assembly including:
      a first one-way clutch operably coupled to said drive motor;
      a first Bowden cable arrangement having a drive end operably coupled to said first one-way clutch and a driven end operably coupled to said flexible support element such that said drive motor continuously cyclically adjusts said first directional adjustment of said flexible support element when driven in said clockwise direction;
      a second one-way clutch operably coupled to said drive motor; and
      a second Bowden cable arrangement having a drive end operably coupled to said second one-way clutch and a driven end operably coupled to said flexible support element such that said drive motor continuously cyclically adjusts said second directional adjustment of said flexible support element when driven in said counter-clockwise direction.

10. The lumbar support system according to claim 9 wherein said first one-way clutch locks and said second one-way clutch slips when said drive motor is driven in said clockwise direction and said second one-way clutch locks and said first one-way clutch slips when said drive motor is driven in said counter-clockwise direction.

11. The lumbar support system according to claim 9 further comprising:
   a first worm gear rotatably mounted to said drive motor;
   a second worm gear operably connected to said first one-way clutch and said first worm gear;
   a third worm gear operably connected to said second one-way clutch and said first worm gear; and
   a pair of gear wheels operably connected to said second and third worm gears, whereby the rotation of said first worm gear drives said pair of gear wheels thereby adjusting said first directional adjustment and said second directional adjustment of said flexible support element.

12. The lumbar support system according to claim 9 wherein said first directional adjustment of said flexible support element is a level directional adjustment and said second directional adjustment of said flexible support element is an arching directional adjustment.

13. The lumbar support system according to claim 9 wherein said flexible support element is made from plastic.

14. The lumbar support system according to claim 9 wherein said flexible support element includes an upper portion for supporting a lumbar vertebrae region and a lower portion for supporting a pelvic vertebrae region.

15. The lumbar support system according to claim 9 further comprising a first extension arm operably coupled to said first Bowden cable arrangement and a second extension arm operably coupled to said second Bowden cable arrangement such that an amount of said first directional adjustment and an amount of said second directional adjustment is increased.

16. A seat assembly having an adjustable seat back comprising:
   a seat back assembly including a frame having a first end and a second end;
   a flexible support element operably connected to said first end of said frame, said flexible support element having a first directional adjustment and a second directional adjustment;
   an operating device selectively positionable in a first direction to operate said first directional adjustment, and in a second direction to operate said second directional adjustment; and
   a gearbox assembly for selectively adjusting said flexible support element, said gearbox assembly including:
      a first one-way clutch operably coupled to said operating device;
      a first Bowden cable arrangement having a drive end operably coupled to said first one-way clutch and a driven end operably coupled to said flexible support element such that said operating device at least substantially continuously adjusts said first directional adjustment of said flexible support element when driven in said first direction;
      a second one-way clutch operably coupled to said operating device, said first one-way clutch locks and said second one-way clutch slips when said operating device is driven in said first rotational direction and said second one-way clutch locks and said first one-way clutch slips when said operating device is driven in said second rotational direction; and
      a second Bowden cable arrangement having a drive end operably coupled to said second one-way clutch and a driven end operably coupled to said flexible support element such that said operating device at least substantially continuously adjusts said second directional adjustment of said flexible support element when driven in said second direction.

17. The seat assembly according to claim 16 wherein said first rotational direction comprises a clockwise rotational direction and said second rotational direction comprises a counter-clockwise rotational direction.

18. The seat assembly according to claim 16 further comprising:
   a first worm gear rotatably mounted to said operating device;
   a second worm gear operably connected to said first one-way clutch and said first worm gear;
   a third worm gear operably connected to said second one-way clutch and said first worm gear; and
   a pair of gear wheels operably connected to said second and third worm gears, whereby the rotation of said first worm gear drives said pair of gear wheels thereby adjusting said first directional adjustment and said second directional adjustment of said flexible support element.

19. The seat assembly according to claim 16 wherein said operating device includes an electric motor.

20. A lumbar support system comprising:
   a flexible support element having a first directional adjustment and a second directional adjustment;

a drive motor selectively driveable in a first rotational direction to operate said first directional adjustment and in a second rotational direction to operate said second directional adjustment; and a gearbox assembly for selectively adjusting said flexible support element, said gearbox assembly including:
  a first one-way clutch operably coupled to said drive motor;
  a first Bowden cable arrangement having a drive end operably coupled to said first one-way clutch and a driven end operably coupled to said flexible support element such that operation of said drive motor in said first rotational direction cyclically adjusts said first directional adjustment of said flexible support element;
  a second one-way clutch operably coupled to said drive motor; and
  a second Bowden cable arrangement having a drive end operably coupled to said second one-way clutch and a driven end operably coupled to said flexible support element such that operation of said drive motor in said second rotational direction cyclically adjusts said second directional adjustment of said flexible support element.

21. The lumbar support system according to claim 20 wherein said first one-way clutch locks and said second one-way clutch slips when said drive motor is driven in said first rotational direction and said second one-way clutch locks and said first one-way clutch slips when said drive motor is driven in said second rotational direction.

* * * * *